(12) United States Patent
Bernelas et al.

(10) Patent No.: US 9,471,890 B2
(45) Date of Patent: Oct. 18, 2016

(54) ENTERPRISE DECISION MANAGEMENT

(71) Applicant: International Business Machines Corporation, Armonk, NY (US)

(72) Inventors: Jean Michel Bernelas, Nice (FR); Steve Demuth, Decorah, IA (US); Stephane Mery, Roquefort les Pins (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 14/147,686

(22) Filed: Jan. 6, 2014

(65) Prior Publication Data
US 2014/0195306 A1 Jul. 10, 2014

(30) Foreign Application Priority Data
Jan. 8, 2013 (GB) ................... 1300258.9

(51) Int. Cl.
*G06Q 10/06* (2012.01)
*G06F 9/455* (2006.01)
*G06F 9/45* (2006.01)

(52) U.S. Cl.
CPC ........... *G06Q 10/0637* (2013.01); *G06F 8/427* (2013.01); *G06F 9/45508* (2013.01)

(58) Field of Classification Search
None
See application file for complete search history.

(56) References Cited

U.S. PATENT DOCUMENTS

| | | | |
|---|---|---|---|
| 6,584,464 B1 * | 6/2003 | Warthen | G06F 17/30398 |
| 7,007,018 B1 | 2/2006 | Kirkwood et al. | |
| 7,444,314 B2 | 10/2008 | Rouvellou et al. | |
| 7,493,253 B1 * | 2/2009 | Ceusters | G06F 17/2775 704/10 |
| 7,865,519 B2 | 1/2011 | Stuhec | |
| 8,050,907 B2 | 11/2011 | Baisley et al. | |
| 2002/0059069 A1 * | 5/2002 | Hsu | G10L 15/18 704/257 |
| 2003/0144978 A1 | 7/2003 | Zeine | |
| 2007/0094219 A1 * | 4/2007 | Kipersztok | G06Q 10/04 706/52 |
| 2012/0004903 A1 | 1/2012 | Pillai et al. | |

OTHER PUBLICATIONS

I. Bajwa, et al., "SBVR Business Rules Generation from Natural Language Specification," Artificial Intelligence for Business Agility—Papers from the AAAI 2011 Spring Symposium; 2010; pp. 1-7.
A. Fayoumi, et al., "SBVR: Knowledge Definition, Vocabulary Management, and Rules Integrations," International Journal of E-Business Development (IJED); vol. 2, No. 2, 2012; Copyright 2012; pp. 70-76.

(Continued)

*Primary Examiner* — Stanley K Hill
*Assistant Examiner* — David H Kim
(74) *Attorney, Agent, or Firm* — Cantor Colburn LLP; Stephen Yoder (57) ABSTRACT

Embodiments relate to managing and executing interpreted language code. An aspect includes a parser configured to parse controlled language code against both a language grammar and for building an execution model comprising parsed known concepts. Another aspect includes a pattern matching engine configured to match patterns in the controlled language code with a patterns for a new concept. Yet another aspect includes a concept engine configured to create a new concept from the matched pattern and controlled language code and for saving the new concept into an object model and into a language grammar so that current and future parsing errors will not occur when recognizing the new concept.

18 Claims, 7 Drawing Sheets

(56) References Cited

OTHER PUBLICATIONS

L. Nemuraite, et al., "Vetis Tool for Editing and Transforming SBVR Business Vocabularies and Business Rules Into UML&OCL Models," Information Technologies' 2010: Proceedings of the 16th International Conference on Information and Software Technologies, IT 2010, IT 2010, Kannas, Lithuania, Apr. 21-23, 2010; pp. 377-384.

S. Craggs, "Lustratus Research: Comparing Operational Decision Management from TIBCO, Oracle and IBM," Dec. 2011; 26 pages.

IBM Redbooks Solution Guide, "Decision Management with IBM Websphere Operational Decision Management," IBM Corporation, Nov. 16, 2012; retrieved http://www.ibm.com/redbooks/abstracts/tips0935.html. ; pp. 1-10.

IBM Software Thought Leadership White Paper, "Why IBM Operational Decision Management? A Case for Business Users of Information Technology," IBM Corporation Jun. 2012; pp. 1-12.

The International Search Report and the Written Opinion of the International Searching Authority date of mailing Mar. 18, 2014 for International Application No. PCT/IB2013/061027 filing date Dec. 17, 2013; pp. 1-8.

\* cited by examiner

GUI 500: Business Rule checkIncome                    502    -  □  X

Document frame 504

Definitions

<u>set</u> 'minimum income' <u>to</u> <u>0.37</u> * <u>the yearly income of 'the borrower'</u>;

<u>If</u>

<u>the yearly repayment of 'the loan' is at least</u> 'minimum income'

<u>Then</u>

<u>in</u> 'the loan report', <u>refuse the loan with the message</u> "Too big Debt/Income ratio."
    + <u>the yearly repayment of 'the loan'</u> / <u>the yearly income of 'the borrower'</u>;

| Concept | Key |
|---|---|
| Language | Underlined |
| Known Concepts | 'quotes' |
| New Concepts | Double underlined |

ENTERPRISE DECISION MANAGEMENT

PRIORITY

This application claims priority to Great Britain Patent Application No. 1300258.9, filed Jan. 8, 2013, and all the benefits accruing therefrom under 35 U.S.C. §119, the contents of which in its entirety are herein incorporated by reference.

BACKGROUND

The present disclosure relates generally to enterprise data management and more specifically to enterprise decision management.

The general environment of decision management comprises decision making tools and change detection tools for providing a rules management system that is easy to evolve, trace, audit, and test.

In decision management environments, users capture business statements using a controlled natural language (CNL). For instance, they capture business rules, business event processing rules or queries, using dedicated business-centric domain specific languages (DSL) that combine ease of use of natural language and the level of formalism required to capture statements that need to be unambiguously executed by a machine.

A controlled natural language is a subset of natural language obtained by restricting the grammar and the vocabulary used, in order to reduce ambiguity and complexity. A system can guide a user through type-ahead suggestions consistent with a CNL. Terms and phrases defined by the user to represent a business domain are part of a CNL. A set of terms and phrases manipulated in a CNL is known as a business vocabulary. Although a business vocabulary is usually defined by the business users who also use business-centric controlled languages, frequently a user would like to use some terminology that does not exist in this vocabulary. Further information about a business vocabulary can be found in the Business Vocabulary and Rules (SBVR) standard as defined by the Object Management Group (OMG), a not-for-profit computer industry standards consortium.

An example is the case where a user needs to set-up a new promotion rule for an e-commerce business and needs to refer to some concept property not yet exposed in the business vocabulary. The user may also want to refer to a specific concept that does not exist. This new element of terminology could represent a completely new piece of data or a new computation of some existing elements. In both cases, the vocabulary needs to be updated to propose the new terminology and allow its usage in the controlled language.

In existing systems, business statement authoring tools are usually decoupled and provided in separate environments, sometimes addressing different kind of users. As a consequence, while capturing a business statement using a controlled language, the user has to go to the business vocabulary authoring environment to add the terminology element he would like to manipulate, before coming back to the statement authoring environment to continue editing his statement. This induces a significant context switch which has a negative impact on the user productivity and increases the risk of introducing errors.

Another issue is that the formalism to capture business vocabulary is usually different from the one used to capture business statements with a controlled language. Techniques and tools used to author a business vocabulary usually relies on dedicated form-based or graphical user interfaces (GUI) similar to the one used to capture object models in modern modeling software.

As a consequence, the user has to switch from a text-based authoring paradigm that characterize tools using controlled languages to a more graphical dedicated user interface, increasing the context switch effect described before.

BRIEF SUMMARY

According to an embodiment, a system for managing and executing interpreted language code is provided. An aspect includes a parser configured to parse controlled language code against both a language grammar and for building an execution model comprising parsed known concepts. Another aspect includes a pattern matching engine configured to match patterns in the controlled language code with a patterns for a new concept. Yet another aspect includes a concept engine configured to create a new concept from the matched pattern and controlled language code and for saving the new concept into an object model and into a language grammar so that current and future parsing errors will not occur when recognizing the new concept.

According to another embodiment, a method and computer program product for managing and executing interpreted language code are provided. An aspect includes parsing controlled language code against a language grammar to build an execution model comprising known concepts. Another aspect includes matching patterns in the controlled language code against patterns for new concepts. Another aspect includes creating a new concept from the matched pattern and the controlled language code. Yet another aspect includes saving the new concept into an object model and into a language grammar so that current and future parsing errors will not occur when recognizing the new concept.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Figure 1:
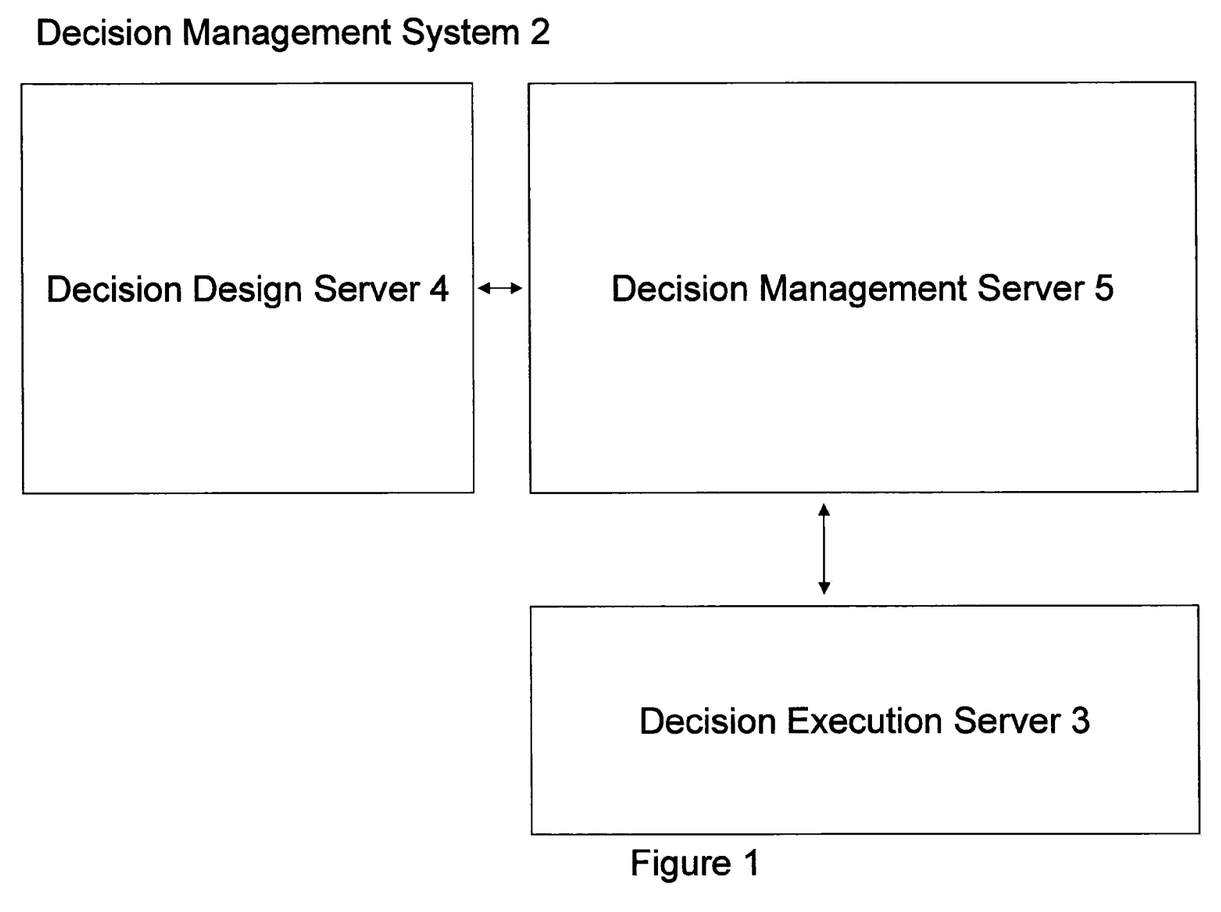
FIG. 1 is decision management system in which a decision management server according to an embodiment is deployed.

Embodiments of enterprise decision management are disclosed herein, with exemplary embodiments being discussed below in detail. Referring to FIG. 1, a decision management system 2 includes: a decision execution server 3; a decision design server 4; and a decision management server 5. Decision execution server 3 is for managing decisions and event detection separately from applications. Decision execution server 3 provides the runtime and development components to automate the response of highly variable decisions based on the specific context of a process, transaction, or interaction. A business network can be monitored to discover and take action on event-based data patterns, and then process this information against hundreds or even thousands of business rules in order to determine how to respond within front-end and back-end systems.

Decision design server 4 is for the rule development before making the rules available to the decision server and the execution server. Decision management server 5 is for putting decision management in the hands of those who drive the business. Business users can manage decisions and events directly based on organizational knowledge and best practices, with limited dependence on the information technology department. The degree of dependence can range from a limited review by business users of the business logic implemented by developers, to complete control over the specification, creation, testing, and deployment of the business logic by business users. Business and information technology functions can work in collaboration, aligning the entire organization in the implementation of automated decisions and accelerating the maintenance life cycle as they evolve based on new external and internal requirements.

Figure 2:
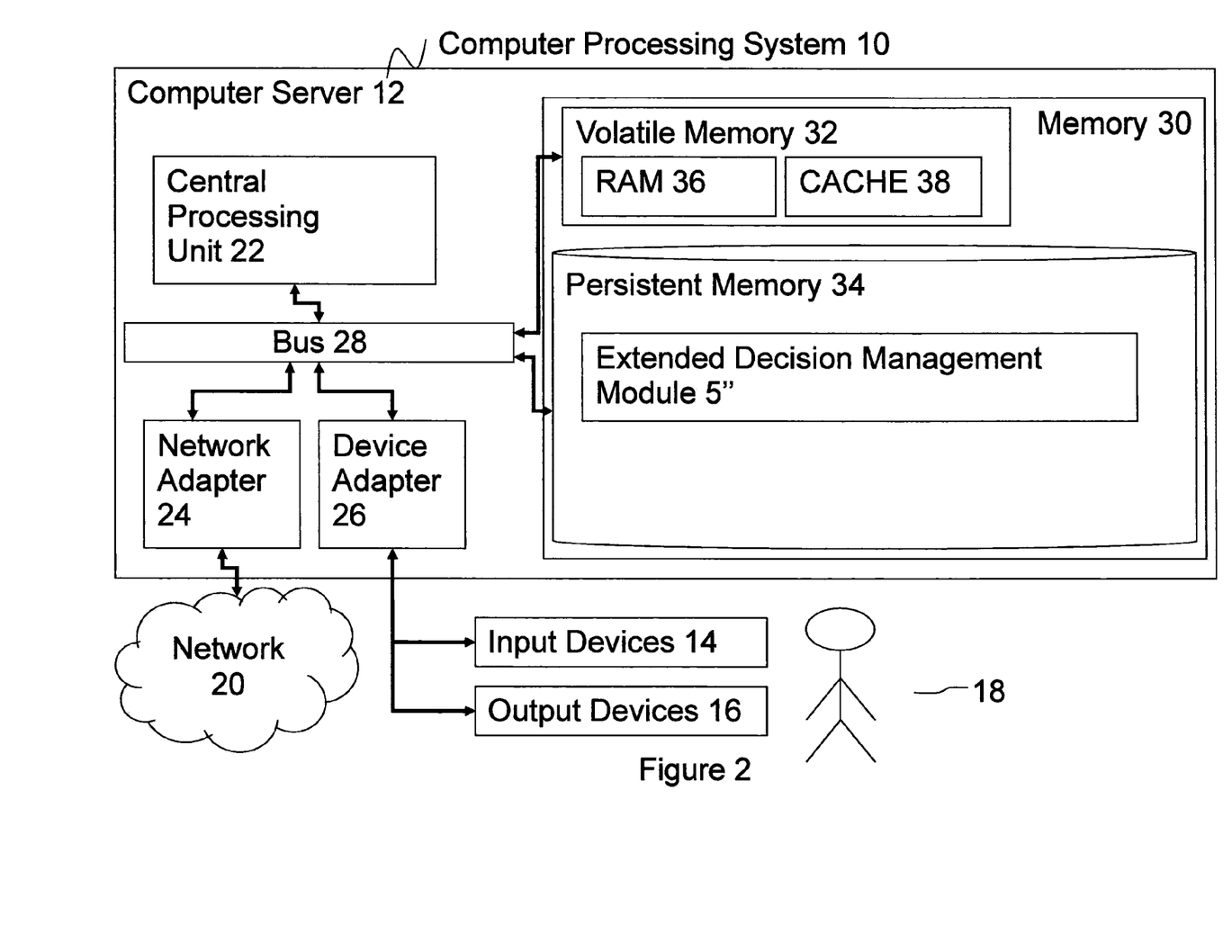
FIG. 2 is a component diagram of a computing system for executing a decision management server according to an embodiment.

Referring to FIG. 2, a deployment of an embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30. CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices. Device adapter 26 is connected to bus 28 and input devices 14 and output devices 16 for enabling communication between computer processing system 10 and input devices 14 and output devices 16. Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown; for example, a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of various embodiments.

In some embodiments, the set of program modules configured to carry out the functions of the embodiments comprises extended decision management module 5" for enabling computer processing system 10 to perform as decision management server 5. Further program modules that support some embodiments but are not shown including firmware, boot strap program, operating system, and support applications. Each of the operating system, support applications, other program modules, and program data or some combination thereof, may include an implementation of a networking environment. A prior art computer server would have prior art decision management module 5' instead of extended decision management module 5".

Similar modules not shown, for instance, a decision execution server module 3' and a decision designer module 4' would enable another computer server (like computer processing system 10) to perform as decision execution server 3 and decision design server 4 respectively. Furthermore all three modules could execute on the same computer server as in a parallel computing embodiment described later.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 3A:
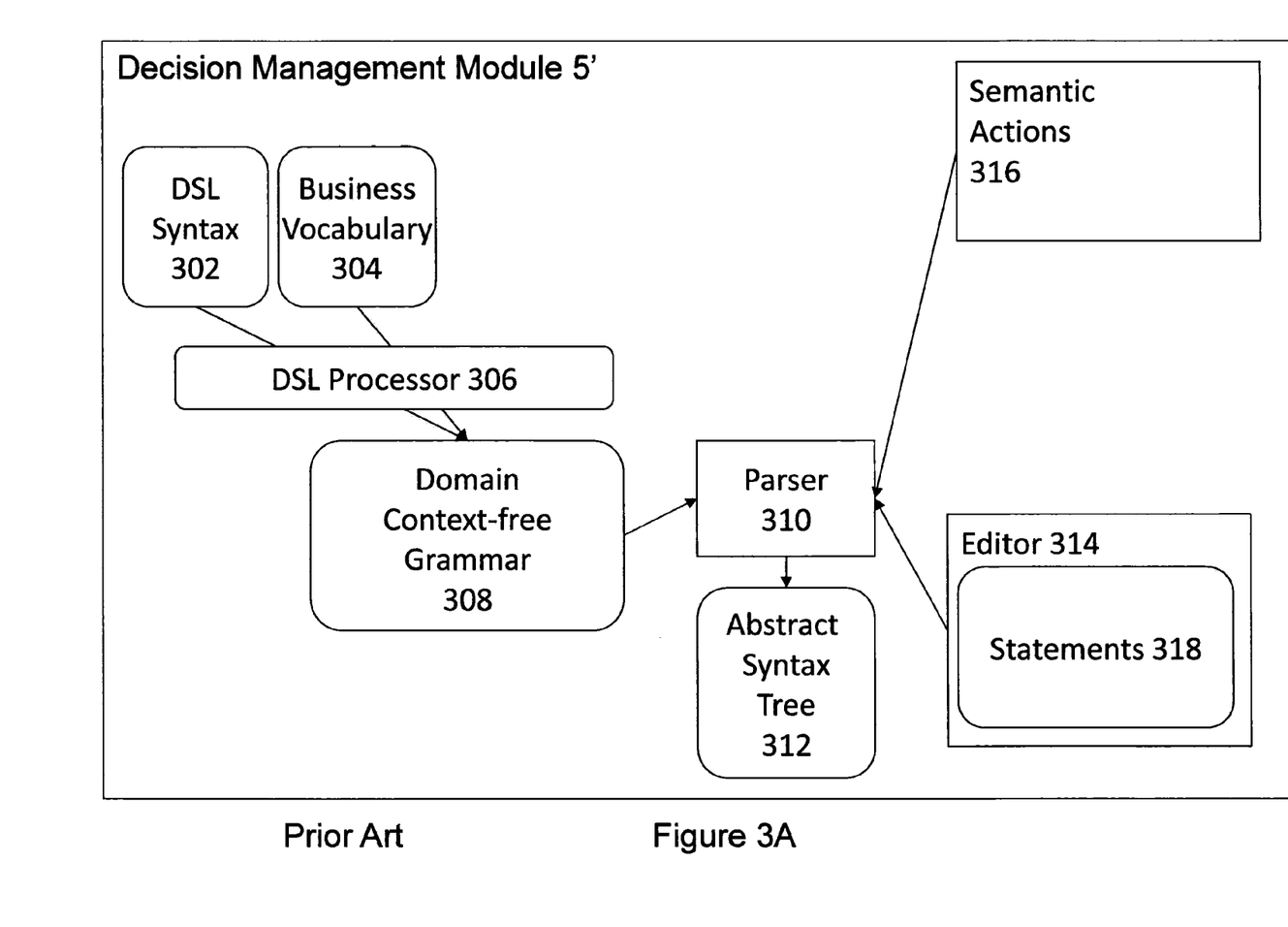
FIG. 3A is a component diagram of a prior art decision management server.

Referring to FIG. 3A, prior art decision management module 5' comprises: domain specific language (DSL) syntax 302; business vocabulary 304; domain specific language (DSL) processor 306; domain context-free grammar 308; parser 310; abstract syntax tree 312; editor 314; and semantic actions 316. Domain specific language (DSL) syntax 302 comprises syntax terms for a domain specific language that enables the parser to check for syntax errors in statements. DSL syntax can be specific to one language (for example syntax for a specific business rules language) or to a type of language (for example a generic business rules language syntax). DSL syntax 302 and business vocabulary 304 are abstract parts of domain context-free grammar 308. DSL processor 306 builds domain context-free grammar 308 from DSL syntax 302 and business vocabulary 304.

Business vocabulary 304 is a set of concepts and the relationships between the concepts. Natural language terms are associated to these concepts to designate them so that a human can reference it. "Car" is, for instance, the English term used to designate the concept of a car. Synonyms terms can be used to designate the same concept. Phrases can be associated to relationships between concepts to "manipulate" these relationships. For instance, a car concept could be linked to a person concept and "a person drives a car" is an English sentence that references this relationship. Furthermore, "a car is driven by a person" is another sentence associated to the same relationship. In many cases, business vocabulary is mapped to a data model whose structure could be slightly different to the business vocabulary. The business vocabulary usually provides a simplified view of this data model. For instance, a person concept may be associated a zip code property in the vocabulary while the corresponding data model features this zip code in the context of an address class, associated to the person class.

Domain specific language (DSL) processor 306 is for computing controlled language grammar 308 from DSL syntax 302 and business vocabulary 304. Domain context-free grammar 308 is built by DSL processor 306 from DSL syntax 302 and business vocabulary 304. Parser 310 is for parsing business statements, for instance as shown in editor 314, against domain context-free grammar 308 and semantic actions 316 and transforming them into abstract syntax tree 312. Abstract syntax tree 312 is an internal representation of the concepts and actions defined by the statements.

Editor 314 is for allowing a user to edit statements 318 compliant with DSL syntax 302 of a given domain specific language. Editor 314 is for providing syntax highlighting, error reporting, and code completion functionalities that assist the user in capturing business statements. Editor 314 is interactive and allows a user to input and modify business statements, taking into account suggestions and assistance tips proposed to him. Semantic actions 316 provide action code corresponding to statements so that the abstract syntax tree 312 can be executed by the decision execution server 3.

Figure 3B:
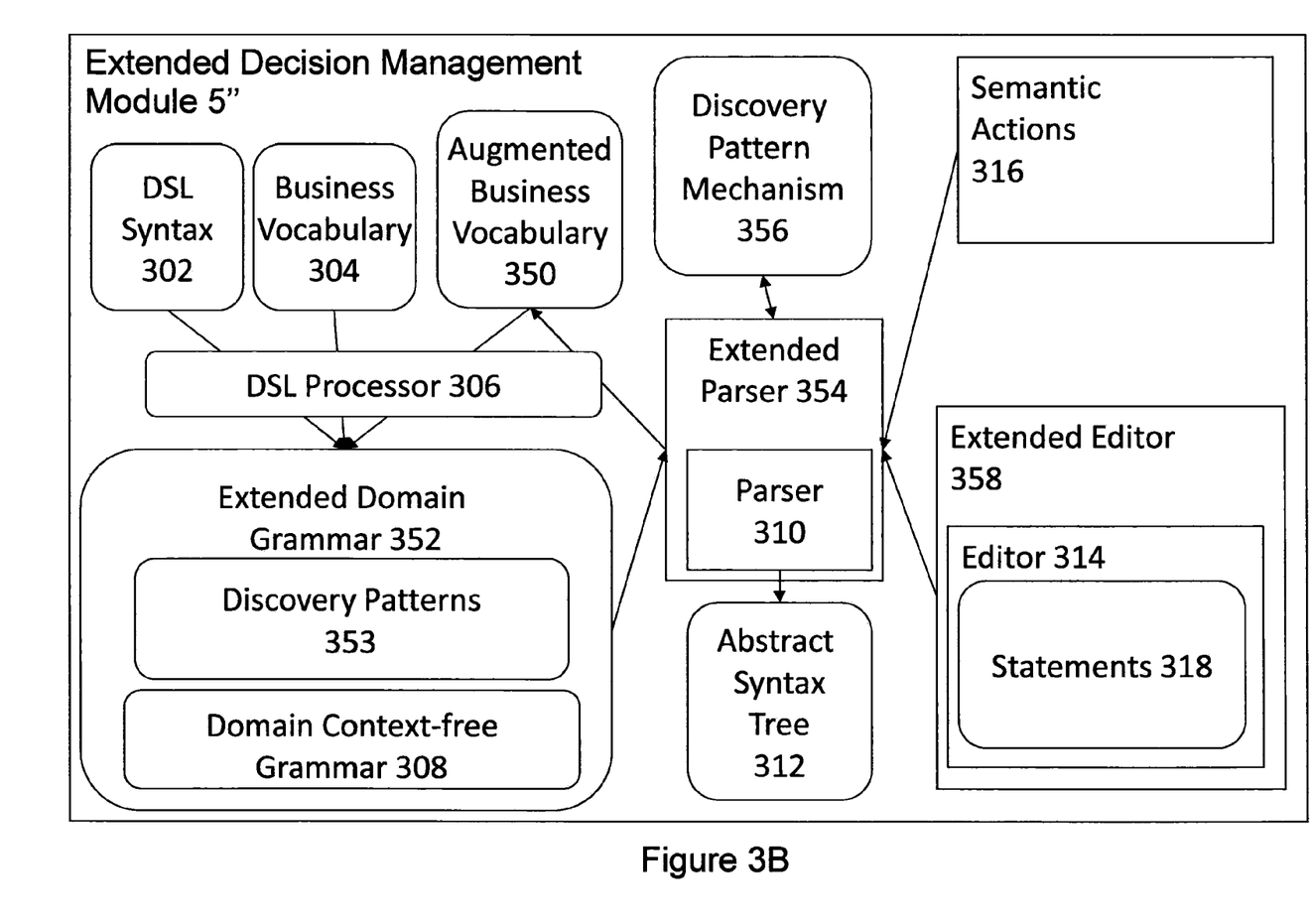
FIG. 3B is a component diagram of a decision management server according to an embodiment.

Referring to FIG. 3B, extended decision management module 5" of some embodiments comprises: all the described components of decision management module 5'. Extended decision management module 5" further comprises: augmented business vocabulary 350; extended domain grammar 352; discovery patterns 353; extended parser 354; discovery pattern mechanism 356; and extended editor 358.

Augmented business vocabulary 350 is for the temporary storage of new business vocabulary for discovered patterns. At a later time, the new business vocabulary will be merged with the main business vocabulary 304. Extended domain grammar 352 comprises domain grammar 308 decorated with discover patterns 353.

Discovery patterns 353 are added to a grammar to make an extended domain grammar. These patterns are abstract grammar rules for pattern matching when existing grammar rules are not able to exactly match the processing text to the existing language syntax and vocabulary. A discovery pattern decorates one or more grammar construct and is associated with an action that has an impact to existing vocabulary. Depending on the discovery pattern, the action can add a new concept, add a new constant or add a new phrase. A discovery pattern is made of a kind of regular expression, specific to a given human language (English or French for instance) that allow for matching of a sequence of words and for recognizing them as given type of vocabulary element. The exact form of the regular expression could be specific to framework in which these patterns are implemented. For instance, the regular expressions could take into account singular or plural form of words to refine the matching; if the pattern matches "premium clients" sequence of words, the pattern could infer that we talk about a "premium client" business concept.

More generally, the way the regular expression is specified and the way the matching is performed is non-trivial and not limited to what is described in this disclosure. In addition, several discovery patterns may apply, and a strategy can be elaborated to select one given pattern, based on its probability or some other strategy. For instance, the discovery pattern may want to avoid matching keywords of the language or words that are usually not significant in a given language to refer to elements of the vocabulary. Words like "if", "of", "the", and "a" are not likely used in the designation of a business concept. The discovery pattern mechanism 356 can decide to not take them into account.

Extended parser 354 is for applying discovery patterns 353 as part of the discovery pattern mechanism 356. Extended parser 354 is activated when the input text does not match the specified domain grammar 308. Discovery pattern mechanism 356 is for discovering patterns defined by discovery patterns 353. When discovered, discovery pattern mechanism 356 is for creating a vocabulary element that is added to the abstract syntax tree and collected in temporary augmented business vocabulary 350. Extended editor 358 is for providing feedback to a user on business vocabulary modifications suggested by discovery pattern mechanism 356.

Figure 4:
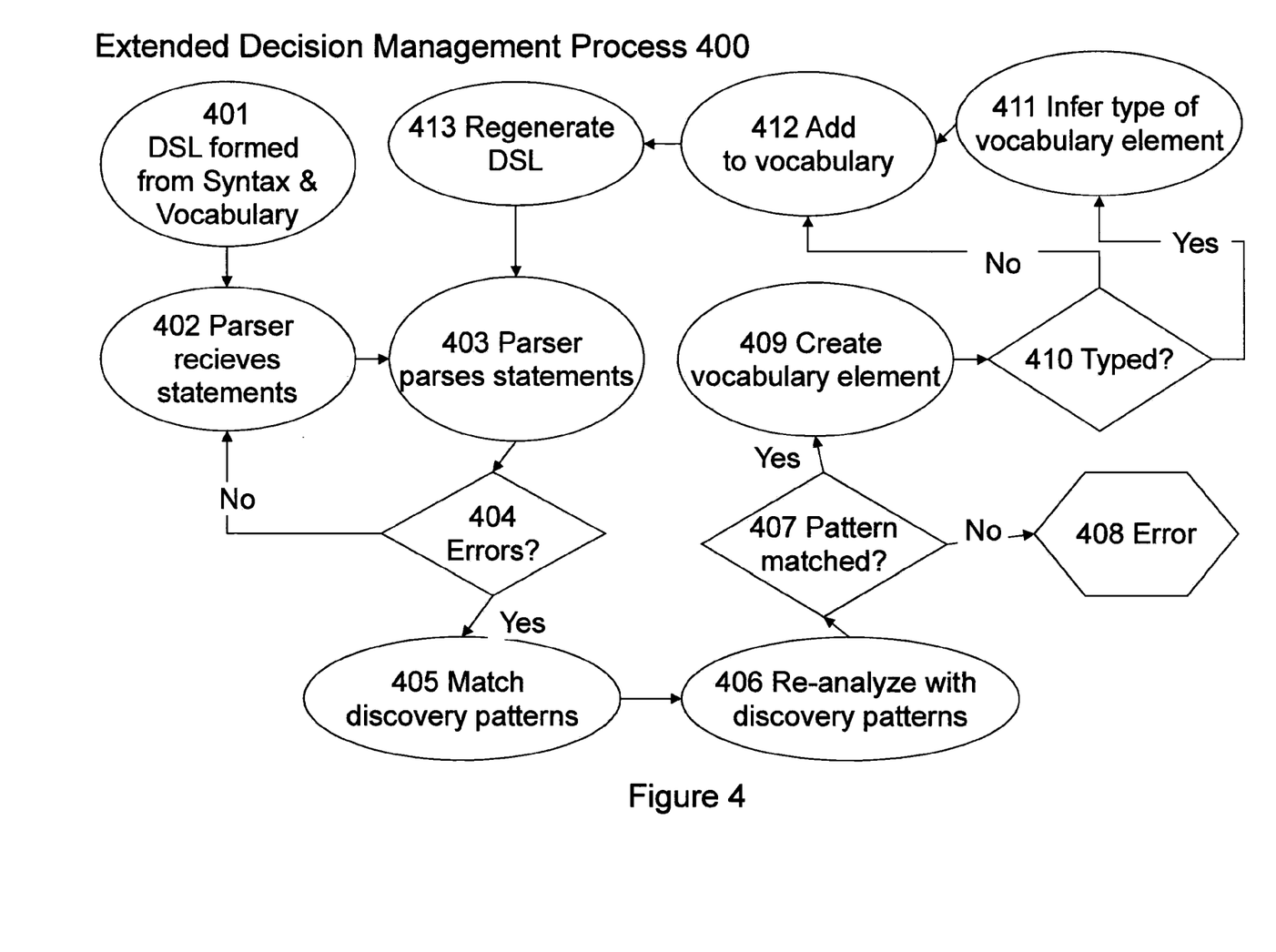
FIG. 4 is a flow diagram of a method of the decision management server of an embodiment.

Referring to FIG. 4, decision management system 2, including extended decision management module 5", performs extended decision management process 400 of some embodiments comprising logical process blocks 401 to 413. Block 401 is for forming extended domain grammar 352 with discovery patterns 353 and domain context-free grammar 308. In the initial state, extended editor 358 is ready to capture business statements for a given business vocabulary and a given domain specific language. Extended parser 354 has been initialized with the extended domain grammar 352. Extended parser 354 has also been extended to communicate with discovery pattern mechanism 356.

Block 402 is for receiving statements at extended parser 354. Using extended editor 358, a user inputs the text of the desired business statement. For the purposes of explaining the embodiment, the text refers to a vocabulary element that does not exist in the current version of the vocabulary. For example "If the number of clients, where the income of each client is more than $100,000, is at least 5 then notify the supervisor". In this example, the underlined words "client" and "income" are concepts that do not exist in the existing business vocabulary 304.

Block 403 is for parsing and analyzing a statement. Extended parser 354 parses the text of the statement and activates extended error recovery to report errors of missing terms. In the example "client" and "income" are not part of the extended domain grammar 352 or the business vocabulary 304.

Block 404 is for determining if type of error is one that can lead to a new concept and, if so determined, moves the process flow to block 405. If the type of error could not lead to a new concept then the process moves back to block 402 and error and statement processing of the prior art continues. Block 405 is for matching discovery patterns that have been added to the extended grammar, in order to analyze the statement. Block 406 is for parsing the non-recognized fragments and to find a best match for potential new vocabulary elements.

Block 407 is for deciding if a pattern has been matched and for forwarding the process to block 408 if no pattern is found. If a pattern is found then further processing continues at block 409. If more than one pattern is found then the selection of a best match pattern may be driven by a best match analysis according to a best match strategy. Block 408 is the end of the extended process as the statement is in error and no pattern has been matched. Block 409 is for creating a vocabulary element from the pattern that matches. A vocabulary element is created for all the concepts and phrases associated to that element. Block 410 is for deciding if the vocabulary element is a type of element or an instance of an element. If the new vocabulary element is not a typed one, for example an action, the extended process continues with no type inference to block 412. Otherwise the type of the new element is inferred at block 411.

Block 411 is for inferring the type of vocabulary element. The type could be inferred according to where the pattern matched in the syntax tree. For instance, a concept property used in an arithmetic expression forces the type to be numerical. The type inference mechanism could be more complex than that and may use information coming from the underlying data model. Block 412 is for adding the new vocabulary element to the augmented business vocabulary 350. Block 413 is for re-generating the extended domain grammar 352 from the augmented business vocabulary 350. The process continues to analyze user input with new extended domain grammar 352 at block 403.

The extended process iterates until either the statement has no more errors or the statement has an error that cannot be recovered by the discovery pattern mechanism (for example the vocabulary cannot be extended to support the statement).

Figure 5:
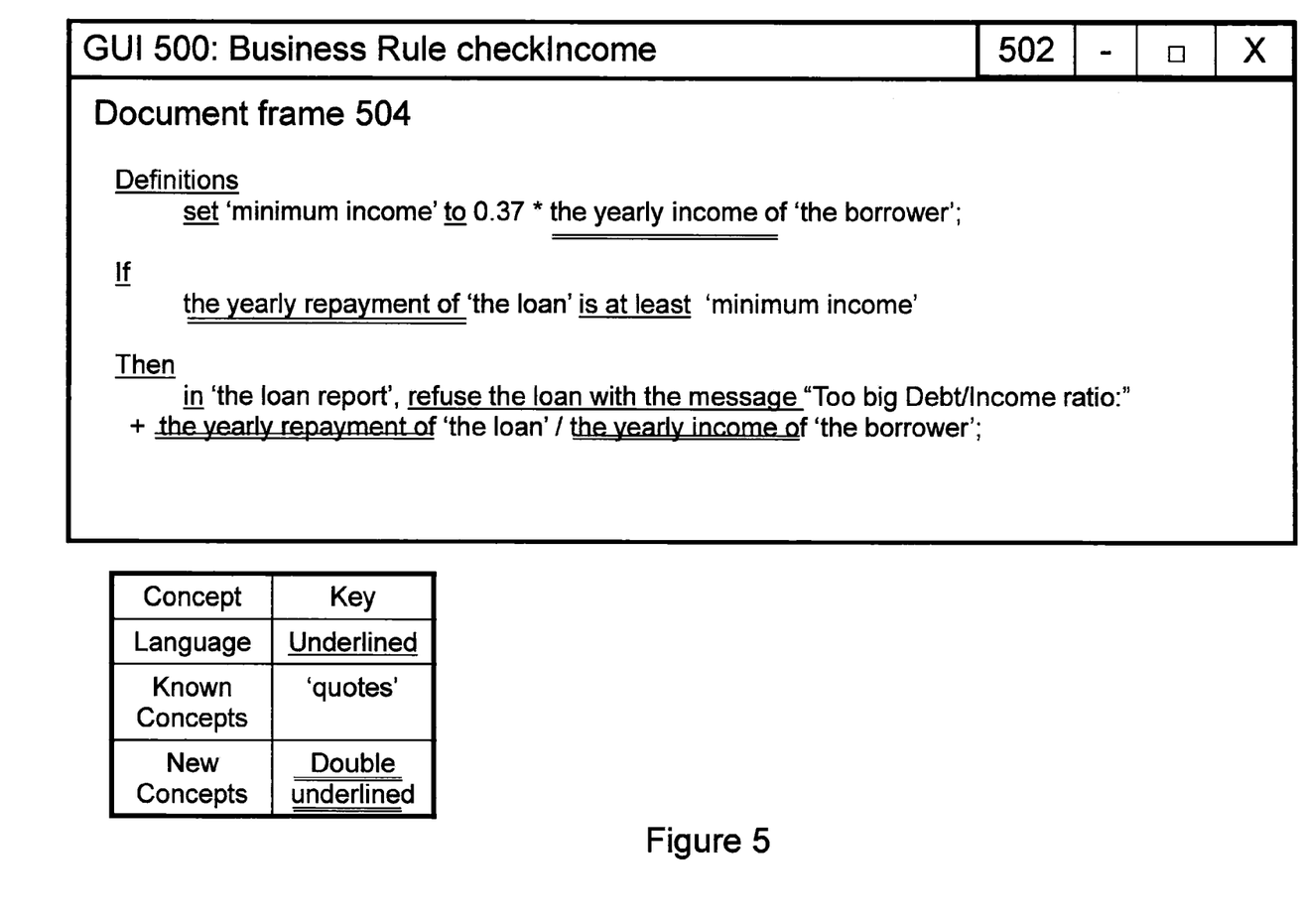
FIG. 5 is an example of the language code processed by an embodiment.

FIG. 5 is an example screen showing a graphical user interface (GUI) 500 for the editor of some embodiments. GUI 500 comprises: window control 502; and document frame 504. Window control 502 provides for minimizing; maximizing and closing of the GUI 500. Document frame 504 is for displaying and editing of code statements. In this case an example set of statements for a business rule named "checkIncome" is displayed.

The example code comprises: definitions (labeled Definitions); a conditional part (labeled If); an action part (labeled Then). Underlining signifies a functional or operational aspect to the terminology and further underlined terms include: set; to; is at least; in; and refuse the loan with the message. Terms inside double quotes signify plain text to be treated as text (in this case by outputting a message). Terms inside single quotation marks signify known business vocabulary. Terms that are double underlined are not recognised in the present vocabulary. An example of such computer code is shown below in Table 1.

TABLE 1

Example Computer Code

Definitions
   set 'minimum income' to 0.37 * the yearly income of 'the borrower';
   If the yearly repayment of 'the loan' is at least 'minimum income'
   Then in 'the loan report', refuse the loan with the message "Too big Debt/Income ratio:" + the yearly repayment of 'the loan' / the yearly income of 'the borrower';

In the example of Table 1, the terms yearly repayment and yearly income are not recognized during parsing and sent for pattern matching and concept creating. In this case, the same pattern was recognized and comprised: a preceding article 'the'; followed by some unknown text; followed by 'of'; and followed by a known concept ('the borrower' and 'the loan').

Other examples of discovery patterns that would be part of an extended grammar could include text that is preceded by any grammar article: ["a" words], ["an" words], ["the" words], ["each" words], ["the" "number" "of" plural_words]. An extended grammar would be decorated with such discovery patterns that match the reference to a concept. This discovery pattern is associated to the grammar rule that match concepts in BAL grammar. The pattern is activated if a statement refers to a concept which is not part of the vocabulary. 'words' is a pattern of text that matches many words excluding keywords that are listed separately.

'plural_words' is a pattern that matches many words whose the last letters are in a plural form, as specified by the verbalization rules.

A discovery pattern is applied with a lower priority than the other grammar rules because it is more likely that an actual grammar rule applies than a new concept is intended to be created.

A property concept involves a relationship between two concepts, an 'owner' concept and an 'owned' concept (the property). Usually several phrases may exist in the vocabulary to refer to this relationship. A property concept is usually strongly typed and the pattern is responsible for recognizing a property concept, as well as its type. For instance in the example given above, 'income' is a property of the 'client' concept. Since this property concept is used with operators that usually apply to number or other comparable types, the type could be inferred.

A property concept pattern has the following description: ["the" words "of" expression], [expression "'s" words]. In the previous example, this pattern matches the 'income' concept property. In this case, discovery pattern action does two different things: adds the property concept to the business vocabulary; and determines the property concept type.

Some embodiments check which type is expected at pattern location. This mechanism is called "propagated type" and allows retrieval of the information that 'income' should be typed as 'dollars' for the full expression to be semantically correct.

Further embodiments are now described. It will be clear to one of ordinary skill in the art that all or part of the logical process blocks of some embodiments may be alternatively embodied in a logic apparatus, or a plurality of logic apparatus, comprising logic elements arranged to perform the logical process blocks of the method and that such logic elements may comprise hardware components, firmware components or a combination thereof.

It will be equally clear to one of skill in the art that all or part of the logic components of some embodiments may be alternatively embodied in logic apparatus comprising logic elements to perform the blocks of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Embodiments may be realized in the form of a computer implemented method of deploying a service comprising blocks of deploying computer program code operable to, when deployed into a computer infrastructure and executed thereon, cause the computer system to perform all the blocks of the method.

It will be appreciated that the method and components of some embodiments may alternatively be embodied fully or partially in a parallel computing system comprising two or more processors for executing parallel software.

Figure 6:
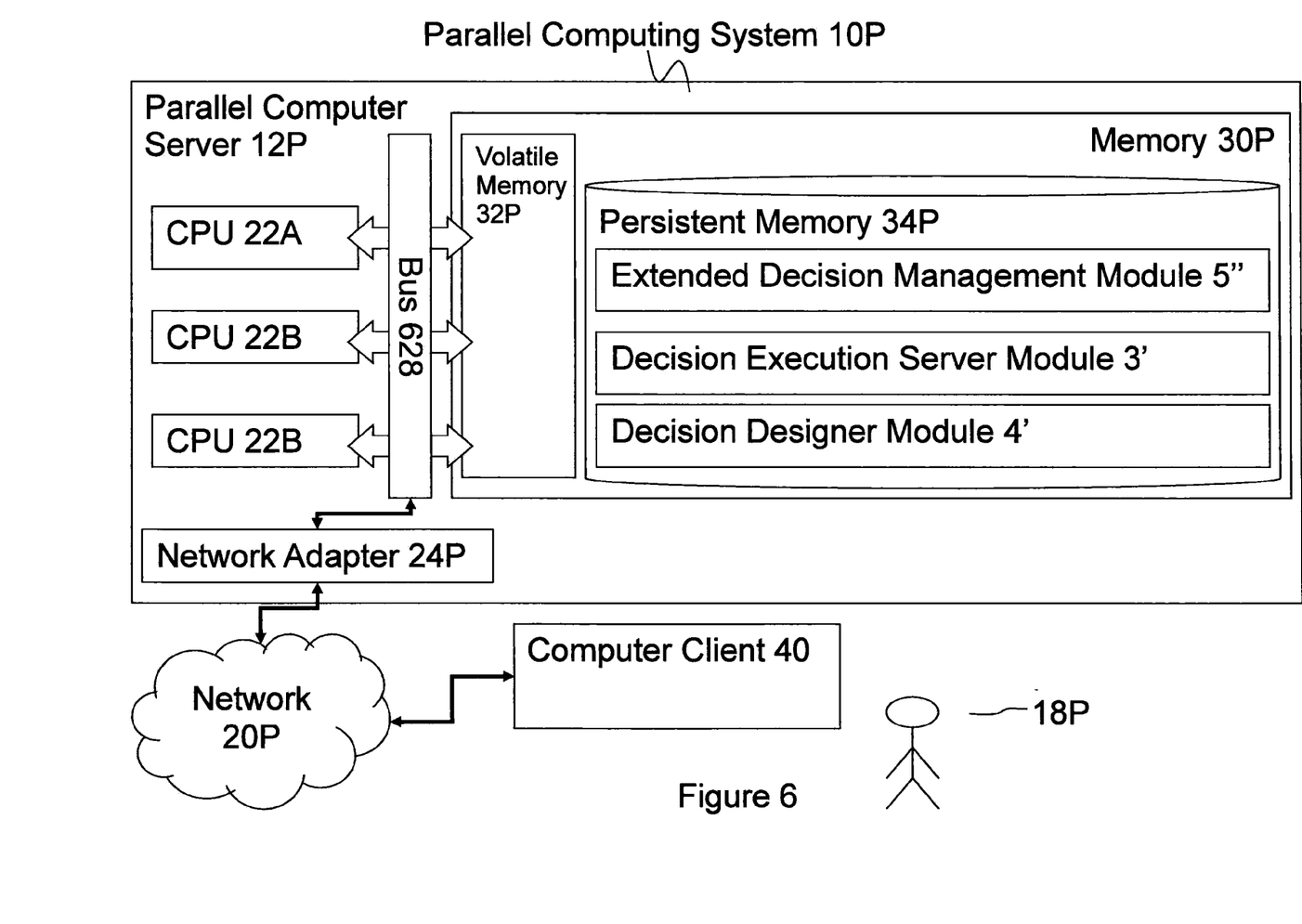
FIG. 6 is a component diagram of a parallel computing system for executing a decision management system according to a parallel computing embodiment.

Referring to FIG. 6, an example parallel computing embodiment is described comprising parallel sets of comprises parallel computing system 10P for parallel processing of instructions. Parallel computing system 10P may be described in the general context of parallel computer system executable instructions, such as parallel program modules, being executed by parallel computing system 10P. Generally, parallel program modules may include routines, programs, objects, components, logic, data structures, that perform particular tasks or implement particular abstract data types. Parallel computing system 10P comprises: parallel computer server 12P; input devices 14P; and output devices 16P. Parallel computing system 10P communicates with user 18P via computer client 40 through network 20P (network 20P can be a cloud network). User 18P provides input and receives output from the parallel computing system 10P but is not part of parallel computing system 10P. Network 20P provides access to network attached devices and is not part of the parallel computing system 10P.

Parallel computer server 12P comprises: CPU 22A, CPU 22B, CPU 22C; network adapter 24P; bus 28P and memory 30P.

Bus 28P represents one or more of any of several types of bus structures, including a memory bus or memory controller, a peripheral bus, an accelerated graphics port, and a processor or local bus using any of a variety of bus architectures.

Memory 30P includes computer system readable media in the form of volatile memory 32P (such as random access memory and cache memory (not shown)) and in the form of non-volatile or persistent memory 34P.

In parallel computing embodiment, program modules comprise: decision execution server module 3'; decision designer module 4'; and extended decision management module 5". Modules are stored in persistent memory 34P, until needed, as well as an operating system, one or more application programs, a database management system and other program modules. Each of the operating system, one or more application programs, other program modules, and program data or some combination thereof, may include an implementation of a networking environment. Modules 3', 4' and 5" are provided to carry out the functions and/or methodologies of the embodiments in a parallel environment as described herein.

Modules 3', 4' and 5" are autonomous parts of the embodiment. In operation, these parts are extracted from persistent memory 34P and loaded into volatile memory 32P so that they may be executed separately and therefore in parallel by respective CPUs 22A, 22B and CPU 22C.

In this example, three CPUs are shown but two or more than three CPUs can be used to build alternative parallel embodiments. In this example, three separate CPUs are used but a single processing unit having multiple cores could be used to build an alternative embodiment. In this example, the CPUs are physical CPUs but. In the described parallel computing embodiment the parallel computer server 12P comprises multiple processing units. In an alternative parallel computing embodiment, a parallel computer server comprises a single processor having multiple cores. In a first virtual parallel computing embodiment, a computer server comprises a virtual computing environment and virtual parallel processing units could be used to build a virtual parallel computing embodiment. A computer server comprises a virtual computing environment having a virtual processing unit with multiple virtual cores. Further embodiments can comprises combinations of: real processing units; real processing unit cores; virtual processing units; and virtual parallel processing cores.

As will be appreciated by one skilled in the art, some embodiments may be embodied as a system, method or computer program product. Accordingly, some embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, some embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for some embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments are described below with reference to flowchart illustrations and/or block diagrams of methods, apparatus (systems) and computer program products according to some embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear to one skilled in the art that many improvements and modifications can be made to the foregoing exemplary embodiment without departing from the scope of the disclosure.

In a first aspect, there is provided a system for managing and executing interpreted language code comprising: a parser for parsing controlled language code against both a language grammar and for building an execution model comprising parsed known concepts; a pattern matching engine for matching patterns in the controlled language code with a patterns for a new concept; and a concept engine for creating a new concept from the matched pattern and controlled language code and for saving the new concept into an object model and into a language grammar so that current and future parsing errors will not occur when recognizing the new concept.

The concepts are not limited to the specific type of business rules concepts but any type of concept including relationships and attributes of concepts.

The embodiments propose creation of a new business vocabulary element while a user edits a business statement using a controlled language and to support the user editing using the new business vocabulary element.

The embodiments propose a text editor that captures a business statement compliant with a given controlled language and that augments the business vocabulary on which the controlled language is based, when the user input text fragments that do not match the grammar but that match specific patterns described with the grammar.

For instance, a user creates the following business rule using a business action language:

If the number of clients where the income of each client is more than $100,000, is at least 5 then notify the supervisor.

The underlined terms "client" and "income" were foreign to, or not part of, the business vocabulary when the statement was written and the embodiments identify the foreign terms and augment the business vocabulary with the foreign terms. Using patterns of where new concepts might be expected to be found in statements, the embodiments make the assumption that a "client" is a concept and an "income" is a property for the "client" concept. The income property is also recognized as being of currency type dollar.

Instead of having a business rule in error, the rule would be correctly interpreted by the system and the increment to the existing vocabulary would be clearly identified. The embodiments changes prior art execution flow process that would have resulted in an error message whereby the embodiments handle some patterns of unknown text and allow an execution flow to continue. The embodiments operate at the machine level of the computer on program code statements regardless of what the program code statement are for. The embodiments comprises a computer that operates in a new way to handle unknown concepts in program code whereas a prior art computer would not so handle. The embodiments increase the reliability of the computer in handling program code.

In some embodiments a discovery pattern mechanism is the pattern matching engine and the concept engine and a decision execution server is the execution engine.

Advantageously an error during parsing of the language grammar triggers a search to match the error with a new concept.

Still more advantageously the interpreted language code comprises rules and actions for making decisions and the system is a decision management system.

In some embodiments, the system further comprises matching patterns in the controlled language against patterns for types of new concepts.

In some embodiments, the pattern matching engine is for matching patterns in the controlled language against patterns for new properties of concepts; and the concept engine is for creating new properties of a concept from the matched pattern and the controlled language code and saving the property of a concept with a corresponding action into the object model; and wherein execution engine is for executing the concepts and actions in the object model.

In some embodiments, the pattern matching engine is for matching patterns in the controlled language against patterns for types of new properties.

In some embodiments, the system further comprises an execution engine for executing the concepts of the object model.

In a second aspect, there is provided a method for managing and executing interpreted language code comprising: parsing controlled language code against a language grammar to build an execution model comprising known concepts; matching patterns in the controlled language against patterns for new concepts; creating a new concept from the matched pattern and the controlled language code; and saving the new concept into an object model.

In a third aspect, there is provided a computer program product for managing and executing interpreted language code, the computer program product comprising a computer-readable storage medium having computer-readable program code embodied therewith and the computer-readable program code configured to perform the method of any one of claims 8 to 14.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect, there is provided a computer program stored on a computer readable medium and loadable into the internal memory of a digital computer, comprising software code portions, when said program is run on a computer, for performing a method.

In a fifth aspect, there is provided a data carrier aspect of some embodiments that comprises functional computer data structures to, when loaded into a computer system and operated upon thereby, enable said computer system to perform all the blocks of the method. A suitable data-carrier could be a solid-state memory, magnetic drive or optical disk. Channels for the transmission of data may likewise comprise storage media of all descriptions as well as signal-carrying media, such as wired or wireless signal-carrying media.

It will be clear to one of ordinary skill in the art that all or part of the method of various embodiments may suitably and usefully be embodied in additional logic apparatus or additional logic apparatuses, comprising logic elements arranged to perform the blocks of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method blocks, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising blocks of deploying computer program code operable to, when deployed into a computer infrastructure and executed thereon, cause the computer system to perform all the blocks of the method.

Various embodiments may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present disclosure.

What is claimed is:

1. A system for managing and executing interpreted language code comprising:
   a parser configured to:
      parse controlled language code against a language grammar to build an execution model comprising parsed known concepts;
      parse a statement to determine that the statement includes a term; and
      determine that the term is not part of the language grammar;
   a pattern matching engine configured to:
      execute pattern matching to determine that a first pattern associated with the term in the statement matches a second pattern associated with one or more of the parsed known concepts; and
      determine, based at least in part on the first pattern matching the second pattern, that the term represents a new concept; and
   a concept engine configured to:
      create the new concept; and
      save the new concept into an object model and into the language grammar so that current and future parsing errors will not occur when recognizing the new concept.

2. The system of claim 1, wherein an error during parsing of the statement triggers the pattern matching engine to execute the pattern matching.

3. The system of claim 1, wherein the interpreted language code comprises rules and actions for making decisions and the system is a decision management system.

4. The system of claim 1, wherein the pattern matching engine is further configured to execute the pattern matching to match patterns in the controlled language code against patterns for types of new concepts.

5. The system of claim 1, wherein the term is a first term, and
   wherein:
      the parser is further configured to:
         parse the statement to determine that the statement includes a second term; and
         determine that the second term is not part of the language grammar;
      the pattern matching engine is further configured to determine, based at least in part on the first pattern matching the second pattern, that the second term represents a new property of the new concept; and
      the concept engine is further configured to create the new property and save the new property with a corresponding action into the object model; and
      the system further comprising an execution engine configured to execute the new concept and the action corresponding to the new property of the new concept.

6. The system of claim 5, wherein the pattern matching engine is further configured to execute the pattern matching to match patterns in the controlled language code against patterns for types of new properties.

7. A method for managing and executing interpreted language code comprising:
   parsing controlled language code against a language grammar to build an execution model comprising known concepts;
   parsing a statement to determine that the statement includes a term;
   determining that the term is not part of the language grammar;
   execute pattern matching to determine that a first pattern associated with the term in the statement matches a second pattern associated with one or more of the parsed known concepts;
   determining, based at least in part on the first pattern matching the second pattern, that the term represents a new concept;

creating the new concept; and saving the new concept into an object model and into the language grammar so that current and future parsing errors will not occur when recognizing the new concept.

8. The method of claim 7, wherein an error during parsing of the statement triggers execution of the pattern matching.

9. The method of claim 7, wherein the interpreted language code comprises rules and actions for making decisions.

10. The method of claim 8, wherein the pattern matching further comprises matching patterns in the controlled language code against patterns for types of new concepts.

11. The method of claim 8, further comprising:

parsing the statement to determine that the statement includes a second term; and determining that the second term is not part of the language grammar;

determining, based at least in part on the first pattern matching the second pattern, that the second term represents a new property of the new concept; and creating the new property; and saving the new property with a corresponding action into the object model; and executing the new concept and the action corresponding to the new property of the new concept.

12. The method of claim 11, wherein the pattern matching further comprises matching patterns in the controlled language code against patterns for types of new properties.

13. A computer program product for managing and executing interpreted language code, the computer program product comprising a computer readable medium having computer-readable program code embodied therewith, which when executed by a computer processor, causes the computer processor to implement a method comprising:

parsing controlled language code against a language grammar to build an execution model comprising known concepts;

parsing a statement to determine that the statement includes a term;

determining that the term is not part of the language grammar;

executing pattern matching to determine that a first pattern associated with the term in the statement matches a second pattern associated with one or more of the parsed known concepts;

determine, based at least in part on the first pattern matching the second pattern, that the term represents a new concept;

creating the new concept; and saving the new concept into an object model and into the language grammar so that current and future parsing errors will not occur when recognizing the new concept.

14. The computer program product of claim 13, wherein an error during parsing of the statement triggers execution of the pattern matching.

15. The computer program product of claim 13, wherein the interpreted language code comprises rules and actions for making decisions.

16. The computer program product of claim 13, wherein the pattern matching further comprises matching patterns in the controlled language code against patterns for types of new concepts.

17. The computer program product of claim 13, further comprising:

parsing the statement to determine that the statement includes a second term;

determining that the second term is not part of the language grammar;

determining, based at least in part on the first pattern matching the second pattern, that the second term represents a new property of the new concept;

creating the new property saving the new property with a corresponding action into the object model; and executing the new concept and the action corresponding to the new property of the new concept.

18. The computer program product of claim 17, wherein the pattern matching further comprises matching patterns in the controlled language code against patterns for types of new properties.

* * * * *